United States Patent [19]

Hunt

[11] Patent Number: 5,002,200

[45] Date of Patent: Mar. 26, 1991

[54] METHOD AND APPARATUS FOR STORING USED PLASTIC BAGS FOR REFUSE

[76] Inventor: William G. Hunt, 1210 N. Main St., Sunset Beach, N.C. 28459

[21] Appl. No.: 398,176

[22] Filed: Aug. 24, 1989

Related U.S. Application Data

[63] Continuation-in-part of Ser. No. 234,671, Sep. 22, 1988, abandoned.

[51] Int. Cl.[5] ........................................ B65G 59/00

[52] U.S. Cl. ........................................ 221/1; 221/63; 206/554

[58] Field of Search .................... 221/61, 63, 1, 33, 47, 221/281; 206/554, 494, 804

[56] References Cited

U.S. PATENT DOCUMENTS

| | | | |
|---|---|---|---|
| 815,337 | 3/1906 | Ellis | 221/63 |
| 2,212,129 | 8/1940 | Rust | 211/59.2 |
| 2,358,709 | 9/1944 | Hayn | 221/61 |
| 3,333,686 | 8/1967 | Schnabel | 221/47 |
| 3,623,636 | 11/1971 | D'Ercoli | 221/63 |
| 4,623,074 | 11/1986 | Dearwester | 221/63 |

*Primary Examiner*—Robert P. Olszewski
*Assistant Examiner*—Kenneth Noland
*Attorney, Agent, or Firm*—Clifton Ted Hunt

[57] ABSTRACT

A container for used plastic bags which have a limited "memory" and tendency to return to their initial size and shape after being used. The container has a confined storage space and an access and dispensing opening which is smaller than the initial size and shape of the bags to be stored. The used bags are compressed when passed into the storage space through the smaller opening, and expand within the container to a size larger than the access and dispensing opening. A finger slot in one wall of the container facilitates dispensing of the bags from the container.

6 Claims, 2 Drawing Sheets

METHOD AND APPARATUS FOR STORING USED PLASTIC BAGS FOR REFUSE

CROSS REFERENCE TO RELATED APPLICATION

This application is a continuation-in-part of patent application Ser. No. 234,671, filed Aug. 22, 1988 for HOLDER FOR USED PLASTIC BAGS now abandoned.

FIELD OF THE INVENTION

This invention relates to a method and apparatus for storing and dispensing used plastic bags of the type commonly used in lieu of paper bags by many grocery stores and other merchants to package merchandise for the customers' convenience.

BACKGROUND OF THE INVENTION

It has long been common practice for retail merchants to package merchandise purchased by their customers in paper bags to facilitate carrying the merchandise. Paper bags are easily refolded into their initial planar configuration by the customer after the bags are unloaded, and customers often refold and save their used paper bags for future use.

Paper bags are being rapidly replaced by plastic bags with hand loops or handles for easy carrying. Merchants are switching to plastic bags because they are light, strong, clean, require less storage space, and are less expensive than paper bags. Customers like the plastic bags because they are easy to carry and are more useful around the home than paper bags.

Plastic bags are more difficult to store than paper bags. Used plastic bag cannot be stored in stacks like new plastic bags and paper bags. Plastic bags have a planar configuration when manufactured but a used plastic bag cannot be returned to its initial flat or planar configuration. This is because the plastic has a limited amount of inherent "memory" which makes it impossible to return a used plastic bag to its initial shape. The limited "memory" partially "forgets" the initial flat shape of the bag when it is attempted to flatten a used plastic bag, causing the plastic in each used bag to arbitrarily and randomly protrude in different directions, making it impossible to stack used plastic bags.

Therefore, previous efforts to store used plastic bags have usually resulted in a fluffed up mess of entangled bags. Many used plastic bags are thrown away because there has not been a satisfactory way to store them.

SUMMARY OF THE INVENTION

The present invention takes advantage of the limited memory of the plastic by providing a confined storage space within a hollow container having an opening which is smaller than the bags being stored and which may serve as a combined bag inlet and dispensing outlet for used plastic bags.

The dimensions of the container and its openings are selected to require compression of the used plastic bags while being placed in and removed from the container. The limited "memory" of the plastic causes the bags to expand within the storage space of the container after they have been compressed to enter the restricted entrance to the container. The expansion of the bags makes them too big to freely pass through the openings and prevents their unintentional removal from the container.

The invention is useful with any size bag but is described for use with bags measuring fifteen (15) inches square when new. In one illustrated embodiment, a hollow box-like cube measuring 5"×5"×5" will hold about 30 to 35 used fifteen inch bags.

In another illustrated embodiment, the container is a tube measuring two inches in diameter and eighteen inches in length. It will hold about fifteen of the fifteen inch used bags.

The essential feature of the invention is that the receiving or access opening between the atmosphere and the confined storage space be small enough that each used plastic bag has to be compressed when it is pushed through that opening into the storage space. The limited memory of the plastic will then cause the bag to expand and prevent the bag from passing back through the opening unless the bag is deliberately pulled out.

DETAILED DESCRIPTION OF THE INVENTION

Figure 1:
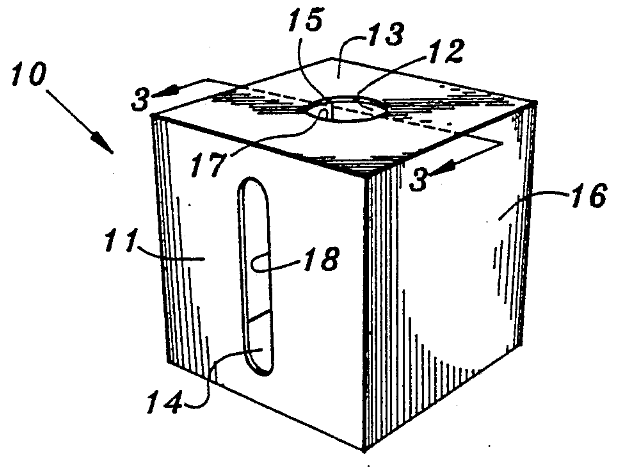
FIG. 1 is a perspective view looking at the front and top of an empty container, representing one illustrated embodiment for storing used plastic bags according to the invention.

Referring more specifically to the drawings, the numeral 10 broadly indicates a container for used plastic bags. The container 10 provides a confined storage space defined by a front wall 11, rear wall 12, top wall 13, bottom wall 14, and side walls 15 and 16. The top wall 13 has an access and dispensing opening 17 providing communication between the atmosphere and the confined storage space and through which used bags are passed for storage in the container 10. The front wall 11 has an elongated opening or finger slot 18 extending in spaced relation between the top and bottom walls 13 and 14 and providing access to maneuver the bags for removal from the confined storage space.

Figure 2:
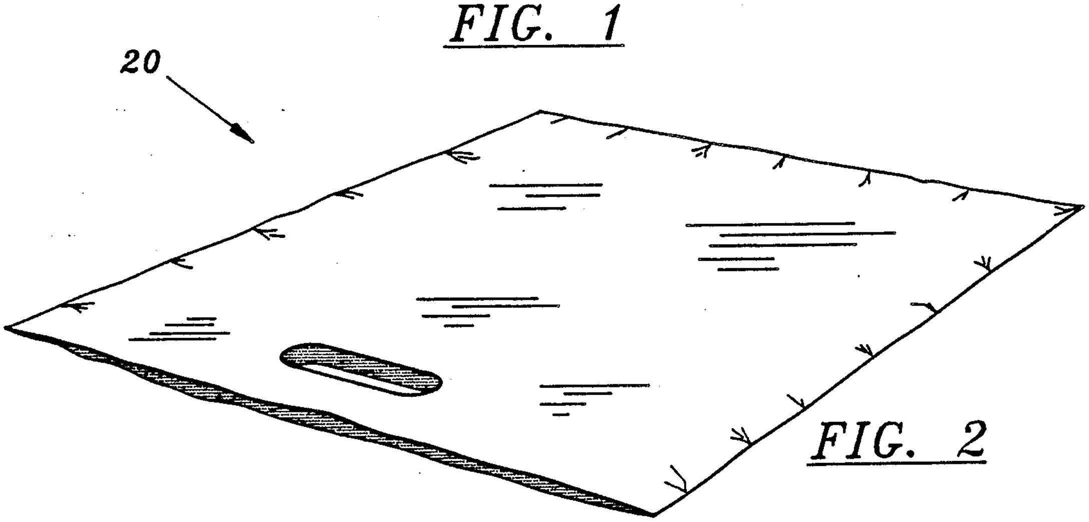
FIG. 2 is a front elevation illustrating the initial planar configuration of a new plastic bag of a type to be stored in any of the containers of this invention after the bag has been used.

The container 10 provides a confined storage space for the storage and dispensing of used plastic bags initially having had, when new, a planar configuration, as indicated at 20 in FIG. 2. The used bags to be stored in the confined storage space of container 10 are misshapen after use from the planar configuration of FIG. 2 to a random configuration illustrated at 20A in FIG. 3.

The inherent "memory" in the used plastic bags tends to cause each of them to return to its initial planar configuration after it has been used. But the "memory" is weak or limited and a used bag never returns to its original planar configuration but extends randomly in all directions when relaxed.

The storage and dispensing containers used in this invention take advantage of the limited "memory" in the used plastic bags by using the limited "memory" to hold the bags within the confined storage space of the container in a manner facilitating easy removal of an individual bag when desired.

The cross sectional dimensions of the access and dispensing opening 17 are less than the corresponding dimensions of the used bags to be stored in the container 10, making it necessary that each bag stored in the container 10 be compressed or wadded into a bulbous configuration to pass through the opening 17. The natural "memory" in the compressed bags causes them to expand within the container to a size larger than the opening 17. The bags are thus prevented from accidental removal from the container.

The finger slot 18 is also of less cross sectional dimensions than the corresponding dimensions of the bag to prevent the bags from accidentally passing through the finger slot. The finger slot provides access to bags within the container that may not be accessible through the access and dispensing opening 17.

The container 10 and bags 20 may be of any desired size but in the illustrated embodiment, the container 10 measures 5"×5"×5" and the bags 20 have cross sectional dimensions of 15"×15" when flattened, as in FIG. 2. A container of these dimensions will hold about 30 to 35 used plastic bags of the stated dimensions.

Figure 3:
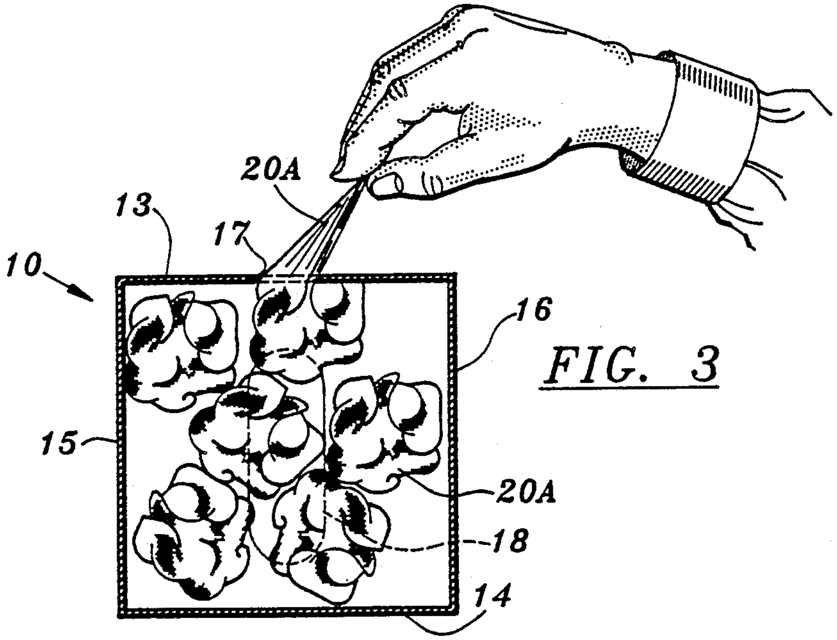
FIG. 3 is a sectional view taken substantially along the line 3—3 in FIG. 1 and showing used plastic bags within the container.

The access and dispensing opening 17 in the illustrated embodiment of FIG. 1 is two inches in diameter and the finger slot 18 is one inch wide and four inches long. FIG. 3 illustrates the dispensing of a used bag through the opening 17 from within the container. A bag may be pulled though the finger slot 18 in a similar manner, or moved along the slot 18 toward the opening 17, where it may be grasped and removed as shown in FIG. 3.

The box-like container 10 is useful on a counter, table, or shelf.

Figures 4, 5:
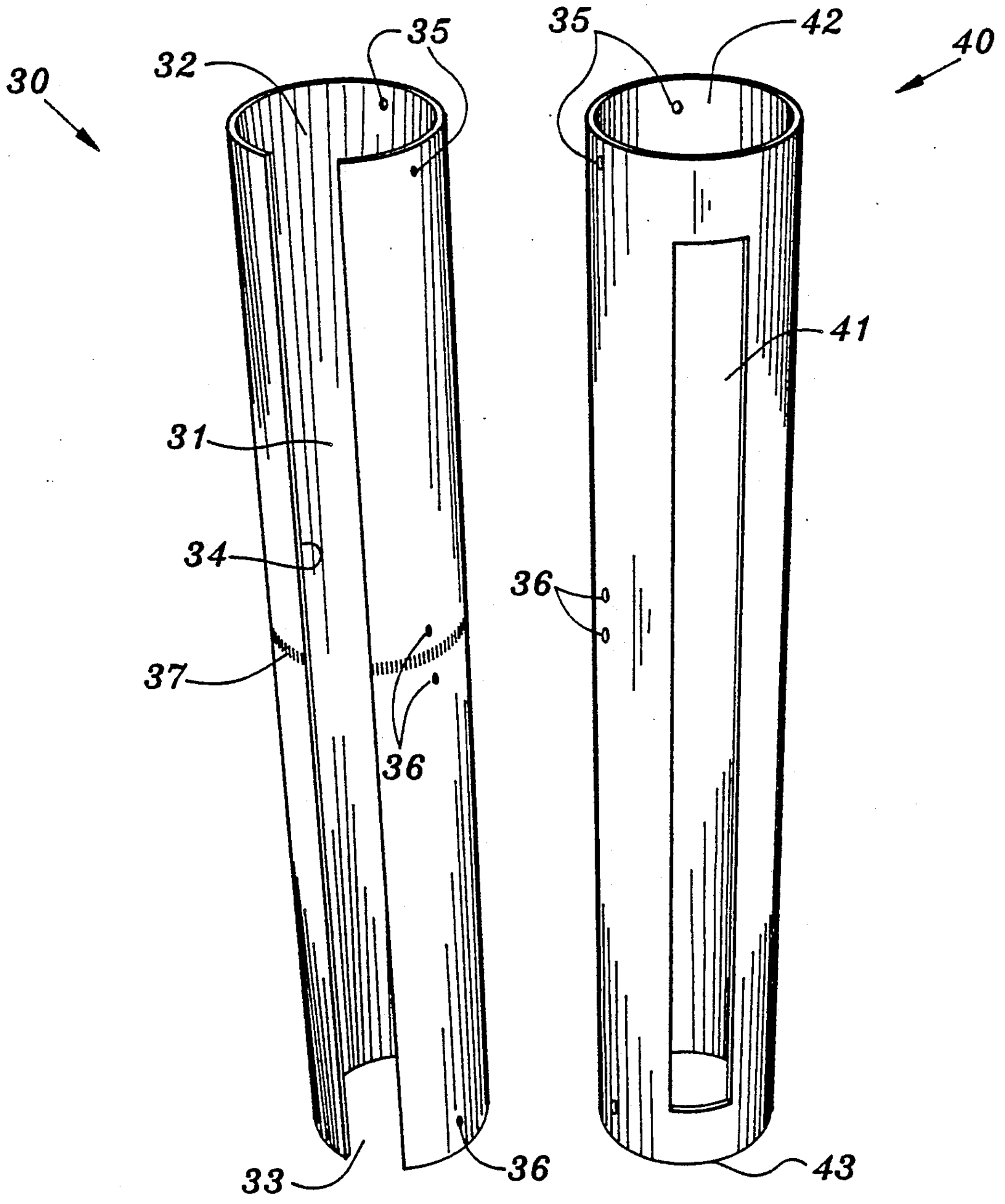
FIG. 4 is a perspective view of a second embodiment of a container for used plastic bags.
FIG. 5 is a perspective view of an alternate construction of the container shown in FIG. 4.

FIGS. 4 and 5 illustrate open ended containers of tubular configuration that may be vertically supported in use, as on the side of a kitchen cabinet. The tubular container 30 of FIG. 4 is two inches in diameter and eighteen inches long, having a one inch finger slot 31 extending between its ends 32 and 33. The dimensions are not critical, but in order to provide for compact storage of a desired quantity of used plastic bags, the inner diameter of the tube 30 and the width of the slot are sufficiently less than the normal expansion of used plastic bags that the bags, when compressed into a bulbous configuration and released within the container 30, will overcome the force of gravity and remain in the open ended tube 30 by pressing radially against the inner surface 34 of the tube with sufficient force to frictionally retain the bags in the holder.

The tubular container 30 requires a mounting space two inches wide and eighteen inches long. Holes 35 extend through the tube 11 to receive screws for attaching the tube to a cabinet or wall in the vertical position of the drawings, or otherwise, as desired. The holes 35 are positioned so the tube can be mounted with the slot 12 either facing straight out from the wall or facing to the left or to the right.

Additional holes 36 are provided near the centerline 37 to enable the user to cut the tube 30 in half and fasten either or both halves for use.

Both open ends 32 and 33 serve as access and dispensing openings, and a used plastic bag is loaded into either end of the tube 30 after compressing the bag to a bulbous configuration about the size of a golf ball. It is necessary to compress bags before inserting them in one of the ends of container 30 to prevent the bag from becoming entangled on one of the corners at the junctures of the slot 31 with the ends 32 and 33 of the tube 30.

After entering the tube 30, the plastic will fluff out against the inner surface 34 of the tube and frictionally hold its position within the open ended tube. Insertion of a second and succeeding used bags will push the first bag further into the tube until the tube is filled. The eighteen inch tube 30 will hold about fifteen of the fifteen inch plastic bags.

When a bag is needed and the tube is full, a bag can be pulled from either end of the tube. When a bag is needed and the tube is not full, the user may insert a finger in the finger slot 31 and slide a bag to either end of the tube where it may be grasped and pulled out. Alternatively, a bag may be pulled through the finger slot 31.

The tubular container indicated at 40 in FIG. 5 is like the tubular container of FIG. 4 in every respect, except that the finger slot 41 of container 40 terminates in spaced relation to the ends of the tube 11. The container 40 of FIG. 5 thus has circular ends 42 and 43 as compared with the split ends 31 and 32 of the tubular container 30 in FIG. 4. Container 40 has holes 35 to receive screws, not shown, for fastening the container to a supporting structure.

The slot 41 may be spaced about an inch from each end 42 and 43 of its tube 40 to define the circular or ring shaped openings 42 and 43 at the ends of the tube 40. The ring shaped openings 42 and 43, being smaller than the cross sectional planar dimensions of the bag, necessarily compress the bag as the bag is forced through one of the ends. The ring shaped openings 42 and 43 enable the user to stuff used plastic bags 20A into either end of the tube 40 without first compressing the bags, as is required with each bag inserted in the container 30 of FIG. 4. The ring shaped configuration of the openings 42 and 43 presents a smooth entrance to the tube 40 and eliminates the danger of the bags becoming entangled with the corners at the ends of the slot 31, as in the tubular container of FIG. 4.

There is thus provided a novel container for used plastic bags which conveniently stores the bags within a minimum of space and presents them to be easily dispensed.

Although the containers have been described and illustrated as a box to be supported on a counter, table, or shelf, and as an open ended tube to be hung on a supporting structure, such as a cabinet, for the purpose of illustration, it is recognized that the container for used plastic bags may be of any desired configuration within the meaning of the accompanying claims to invention.

I claim:

1. A method of storing and dispensing used plastic bags having a limited "memory" and having had an initial flat and rectangular configuration before being used, said method comprising the steps of:

(a) providing a container having a confined storage space defined by an open ended tube with cross-sectional dimensions less than the initial cross-sectional dimensions of the plastic bags and at least one open end of the tube defining a restricted opening providing communication between the confined storage space and the atmosphere at one end of the tube;

(b) successively forming used plastic bags into a bulbous configuration; and (c) utilizing the dynamism of the bulbous-shaped used plastic bags by successively pushing said bulbous-shaped used plastic bags through the restricted opening and into the confined storage space, whereby the dynamism of the bulbous-shaped used plastic bags causes the bags to expand within the confined storage space and resist accidental removal of the bags from the container.

2. A method according to claim 1 wherein the tube has a continuous slot extending between the ends of the tube and defining a finger slot.

3. A method according to claim 1 wherein the ends of the tube are ring shaped, and the tube has a slot extending between the ring shaped ends.

4. A method of storing and dispensing used plastic bags having a limited "memory" and having had an initial flat and rectangular configuration before being used, said method comprising the steps of:

(a) providing a container having a confined storage space defined by top and bottom walls, side walls and front and rear walls with cross-sectional dimensions less than the initial cross-sectional dimensions of the plastic bags and the top wall having a restricted opening with cross-sectional dimensions less than the cross-sectional dimensions of the confined storage space and providing communication between the confined storage space and the atmosphere at one end of the container and the front wall of the container having a finger slot extending in spaced relation between the top wall and the bottom wall, whereby a person's finger may extend through the slot and guide a bag to the top of the container to be removed from the container through the restricted opening;

(b) successively forming used plastic bags into a bulbous configuration; and (c) utilizing the dynamism of the bulbous-shaped used plastic bags by successively pushing said bulbous-shaped used plastic bags through the restricted opening and into the confined storage space, whereby the dynamism of the bulbous-shaped used plastic bags causes the bags to expand within the confined storage space and resist accidental removal of the bags from the container.

5. A method of storing and dispensing used plastic bags having a limited "memory" and having had an initial rectangular configuration before being used, said method comprising the steps of:

(a) providing a container having a confined storage space defined by an open ended tube with the confined storage space between the ends of the container, each end of the open ended tube having cross-sectional dimensions less than the initial cross-sectional dimensions of the plastic bags, each end of the open ended tube defining a restricted opening providing communication between the confined storage space and the atmosphere at one end of the tube and the ends of the tube being ring shaped, whereby the bags are compressed into a non-rectangular configuration as they are pushed through the restrictive opening; and (b) creating a dynamism within the used plastic bags by compressing successive used plastic bags into a non-rectangular configuration while pushing the used plastic bags through the restricted opening into the confined storage space, whereby the dynamism of the non-rectangular shaped used plastic bags causes the bags to expand within the confined storage space and resist accidental removal of the bags from the container.

6. A method according to claim 5 wherein the container has a slot extending perpendicularly to the ends of the container and providing communication between the confined storage space and the atmosphere, whereby a person's finger may extend through the slot and move a bag to either end of the container for removal of the bag through the restricted opening.

* * * * *